US012724918B2

(12) United States Patent
Berger et al.

(10) Patent No.: US 12,724,918 B2
(45) Date of Patent: Sep. 1, 2026

(54) PROTECTING CONFIDENTIAL INFORMATION IN A NEURAL-COMPUTER INTERFACE SYSTEM

(71) Applicant: International Business Machines Corporation, Armonk, NY (US)

(72) Inventors: Sara E Berger, Beaverton, OR (US); Marc P. Yvon, Antony (FR); Neil Delima, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 18/502,309

(22) Filed: Nov. 6, 2023

(65) Prior Publication Data

US 2025/0148123 A1 May 8, 2025

(51) Int. Cl.

*G06F 21/62* (2013.01)
*G06F 1/16* (2006.01)
*H04L 9/40* (2022.01)

(52) U.S. Cl.

CPC .......... *G06F 21/6245* (2013.01); *G06F 1/163* (2013.01); *H04L 63/0227* (2013.01); *H04L 63/04* (2013.01)

(58) Field of Classification Search

CPC . G06F 21/6245; G06F 1/163; H04L 63/0227; H04L 63/04; A61B 5/165; A61B 5/369; A61B 5/7267; H04W 12/088; H04W 12/33; H04W 12/68; H04W 12/02

See application file for complete search history.

(56) References Cited

U.S. PATENT DOCUMENTS 7,418,290 B2 * 8/2008 Devlin .................. A61B 5/374 600/545
12,105,785 B2 * 10/2024 Maizels .................. G06F 21/32
12,130,901 B2 * 10/2024 Wexler .................... G06F 21/32

(Continued)

FOREIGN PATENT DOCUMENTS

CN 113425047 A 9/2021
CN 111956219 B 4/2023

(Continued)

OTHER PUBLICATIONS

Alicart et al., "Gossip information increases reward-related oscillatory activity", Neuroimage, Apr. 15, 2020, 210:116520, . Epub Jan. 7, 2020, 9 pages, https://doi.org/10.1016/j.neuroimage.2020.116520.

(Continued)

*Primary Examiner* — Navin Natnithithadha
(74) *Attorney, Agent, or Firm* — Kelsey M. Skodje

(57) ABSTRACT

A method, system, and computer program product detect and react to neural signals. The method includes monitoring the neural signals, which are collected from a user by a neural-computer interface (NCI) device. The method further includes detecting, based on the monitoring, an inhibitory signal in the neural signals and determining, in response to the detecting, that the inhibitory signal is aligned with an emotionally salient signal. Additionally, the method includes generating a notification in response to the determining that the inhibitory signal is aligned with the emotionally salient signal. The notification is displayed at an output device.

20 Claims, 3 Drawing Sheets

(56) References Cited

U.S. PATENT DOCUMENTS

| | | | | |
|---|---|---|---|---|
| 12,131,739 | B2 * | 10/2024 | Maizels | G06V 40/174 |
| 12,141,262 | B2 * | 11/2024 | Wexler | G06F 21/32 |
| 12,142,280 | B2 * | 11/2024 | Maizels | G06V 40/174 |
| 12,142,281 | B2 * | 11/2024 | Wexler | G06V 40/174 |
| 12,142,282 | B2 * | 11/2024 | Maizels | G06V 40/174 |
| 12,147,521 | B2 * | 11/2024 | Wexler | G06F 21/32 |
| 12,154,572 | B2 * | 11/2024 | Wexler | G06V 40/174 |
| 12,204,627 | B2 * | 1/2025 | Wexler | G06F 21/32 |
| 12,205,595 | B2 * | 1/2025 | Maizels | G06V 40/174 |
| 12,216,749 | B2 * | 2/2025 | Maizels | G06F 21/32 |
| 12,216,750 | B2 * | 2/2025 | Wexler | G06F 21/32 |
| 12,505,190 | B2 * | 12/2025 | Maizels | G06F 21/32 |
| 2003/0013981 | A1 * | 1/2003 | Gevins | A61B 5/4076 600/544 |
| 2005/0043774 | A1 * | 2/2005 | Devlin | A61B 5/6814 607/45 |
| 2008/0167571 | A1 * | 7/2008 | Gevins | A61B 5/4094 600/544 |
| 2014/0228701 | A1 | 8/2014 | Chizeck et al. | |
| 2014/0316230 | A1 * | 10/2014 | Denison | A61B 5/0006 600/545 |
| 2016/0287166 | A1 | 10/2016 | Tran | |
| 2016/0302711 | A1 * | 10/2016 | Frank | A61B 5/746 |
| 2017/0095157 | A1 | 4/2017 | Tzvieli et al. | |
| 2024/0070251 | A1 * | 2/2024 | Maizels | G06F 21/32 |
| 2024/0070252 | A1 * | 2/2024 | Maizels | G06V 40/174 |
| 2024/0071364 | A1 * | 2/2024 | Maizels | G06V 40/174 |
| 2024/0071386 | A1 * | 2/2024 | Maizels | G06V 40/174 |
| 2024/0073219 | A1 * | 2/2024 | Maizels | G06V 40/174 |
| 2024/0079011 | A1 * | 3/2024 | Maizels | G06F 21/32 |
| 2024/0079012 | A1 * | 3/2024 | Maizels | G06F 21/32 |
| 2024/0087361 | A1 * | 3/2024 | Wexler | G06F 21/32 |
| 2024/0096328 | A1 * | 3/2024 | Wexler | G06F 21/32 |
| 2024/0119937 | A1 * | 4/2024 | Wexler | G06F 21/32 |
| 2024/0119938 | A1 * | 4/2024 | Wexler | G06F 21/32 |
| 2024/0119961 | A1 * | 4/2024 | Maizels | G06V 40/174 |
| 2024/0127816 | A1 * | 4/2024 | Wexler | G06V 40/174 |
| 2024/0127817 | A1 * | 4/2024 | Wexler | G06F 21/32 |
| 2024/0127824 | A1 * | 4/2024 | Wexler | G06V 40/174 |

FOREIGN PATENT DOCUMENTS

| | | | | |
|---|---|---|---|---|
| WO | WO-2006073384 A1 * | 7/2006 | | A61B 5/16 |
| WO | WO-2009129480 A2 * | 10/2009 | | G16H 20/70 |

OTHER PUBLICATIONS

Anonymous, "BCI milestone: New research from UCSF with support from Facebook shows the potential of brain-computer interfaces for restoring speech communication", Meta, Jul. 14, 2021, 17 pages, <https://tech.facebook.com/reality-labs/2021/07/bci-milestone-new-research-from-ucsf-with-support-from-facebook-shows-the-potential-of-brain-computer-interfaces-for-restoring-speech-communication/>.

Anonymous, "Brain Filters", Think Social Publishing, Inc., Copyright © 2021, 2 pages, <https://www.socialthinking.com/>.

Anonymous, "How the Brain Prepares For Action", Neuroscience News, Feb. 7, 2019, 8 pages, <https://neurosciencenews.com/brain-action-preparation-10710/>.

Anonymous, "Machine Learning", 1 page, downloaded from the Internet on Sep. 13, 2023, https://www.frontiersin.org/files/Articles/272182/fnbot-11-00038-HTML/image_m/fnbot-11-00038-g001.jpg>.

Anonymous, "N200 (neuroscience)", Wikipedia, This page was last edited on Aug. 15, 2023, 6 pages.

Anonymous, "neurosynth.org", downloaded from the Internet on Sep. 14, 2023, 2 pages, <neurosynth.org>.

Anonymous, "Real and Imagined Movements Are Controlled by the Brain in the Same Way", Neuroscience News, Apr. 24, 2018, 9 pages, <https://neurosciencenews.com/real-imagined-movement-8868/>.

Anonymous, "A real emotion evaluation system based on wearable emotion recognition device," IP.com No. IPCOM000251219D, IP.com Electronic Publication IP.com Electronic Publication Date: Oct. 26, 2017, 5 pages.

Anonymous, "An Intelligent Alert System for Negative Emotions," An IP.com Prior Art Database Technical Disclosure, IP.com No. IPCOM000268929D, IP.com Electronic Publication Date: Mar. 9, 2022, 3 pages.

Anonymous, "Confidential Information privacy using a Cognitive System," IP.com No. IPCOM000252890D, IP.com Electronic Publication Date: Feb. 20, 2018, 4 pages.

Anonymous, "Method and System for AR-Based Visualization of the Consequences of Steps That Workers Intend to Perform," IP.com No. IPCOM000271673D, IP.com Electronic Publication Date: Jan. 27, 2023, 4 pages.

Baca, Arnold, "Methods for Recognition and Classification of Human Motion Patterns—A Prerequisite for Intelligent Devices Assisting in Sports Activities", IFAC Proceedings Volumes, vol. 45, Issue 2, 2012, pp. 55-61, https://doi.org/10.3182/20120215-3-AT-3016.00009.

Belkacem, Abdelkader Nasreddine , "Cybersecurity Framework for P300-based Brain Computer Interface", 2020 IEEE International Conference on Systems, Man, and Cybernetics (SMC). Oct. 11-14, 2020. Toronto, Canada, pp. 1-6, doi: 10.1109/SMC42975.2020.9283100.

Bianchin et al., "Decision Preceding Negativity in the Iowa Gambling Task: An ERP study", Brain and Recognition 75 (2011), pp. 273-280, doi:10.1016/j.bandc.2011.01.005.

Brosch et al., "Additive effects of emotional, endogenous, and exogenous attention: Behavioral and electrophysiological evidence", Neuropsychologia 49.7 (2011): pp. 1779-1787.

Candia-Rivera et al., "Cardiac sympathetic-vagal activity initiates a functional brain-body response to emotional arousal", PNAS, May 19, 2022, 27 pages, https://doi.org/10.1073/pnas.2119599119.

Carver et al., "Anger Is an Approach-Related Affect: Evidence and Implications", Psychological Bulletin, American Psychological Association, 2009, vol. 135, No. 2, pp. 183-204, DOI: 10.1037/a0013965.

Chmura et al., "Classification of Movement and Inhibition using a Hybrid BCI", frontiers in Neurorobotics, published Aug. 15, 2017, 7 pages, https://doi.org/10.3389/fnbot.2017.00038.

Choi et al., "Brain Computer Interface-Based Action Observation Game Enhances Mu Suppression in Patients with Stroke", MDPI, Electronics 2019, 8, 1466, Published: Dec. 2, 2019, 15 pages, doi:10.3390/electronics8121466.

Cui et al., "The brain-computer interface based robot gives spinal cord injury patients a full-cycle active rehabilitation", 2021 9th International Winter Conference on Brain-Computer Interface (BCI), 5 pages, DOI: 10.1109/BCI51272.2021.9385371.

Datta et al., "The P300 as a Marker of Waning Attention and Error Propensity", Hindawi Publishing Corporation, Computational Intelligence and Neuroscience, vol. 2007, Article ID 93968, 9 pages, doi:10.1155/2007/93968.

Del Giudice et al., "The Voice of Anger: Oscillatory EEG Responses to Emotional Prosody", PLoS One, Published online Jul. 21, 2016, 11 pages, doi: 10.1371/journal.pone.0159429.

Deniz et al., "Automated robust human emotion classification system using hybrid EEG features with ICBrainDB dataset", Abstract only, Springer Link, Published: Nov. 10, 2022, 12 pages, <https://link.springer.com/article/10.1007/s13755-022-00201-y>.

Dillon et al., "Inhibition of Action, Thought, and Emotion: A Selective Neurobiological Review", NIH Public Access, Published in final edited form as: Appl Prev Psychol. Dec. 2007; 12(3): 99-114, <https://www.ncbi.nlm.nih.gov/pmc/articles/PMC2396584/>.

Durham, Emily, "First-ever noninvasive mind-controlled robotic arm", Carnegie Mellon University, College of Engineering, downloaded from the Internet on Sep. 13, 2023, 3 pages, <https://engineering.cmu.edu/news-events/news/2019/06/20-he-sci-robotics.html>.

Eijlers et al., "Implicit measurement of emotional experience and its dynamics", PLoS One, 14(2): e0211496, Feb. 5, 2019, 15 pages, https://doi.org/10.1371/journal.pone.0211496.

(56) References Cited

OTHER PUBLICATIONS

Farwell et al., "Brain fingerprinting classification concealed information test detects US Navy military medical information with P300", Frontiers in Neuroscience, published: Dec. 23, 2014,22 pages, doi: 10.3389/fnins.2014.00410.

Filimon et al., "Human cortical representations for reaching: mirror neurons for execution, observation, and imagery", NeuroImage 37 (2007) 1315-1328, Available online Jun. 18, 2007, <https://europepmc.org/article/med/17689268>.

Gable et al., "The motivational dimensional model of affect: Implications for breadth of attention, memory, and cognitive categorisation", Psychology Press, Cognition and Emotion 2010, 24 (2), pp. 322-337, DOI: 10.1080/02699930903378305.

Gannouni et al., "Emotion detection using electroencephalography signals and a zero time windowing based epoch estimation and relevant electrode identification", Nature Scientific Reports, (2021) 11:7071, 17 pages, https://doi.org/10.1038/s41598-021-86345-5.

Garofalo et al., "Mediofrontal negativity signals unexpected omission of aversive events", Scientific Reports, 4 : 4816, 8 pages, DOI: 10.1038/srep04816.

Guo et al., "Effect of Virtual Reality on Fear Emotion Base on EEG Signals Analysis", 2019 IEEE MTT-S International Microwave Biomedical Conference (IMBioC), Nanjing, China, 2019, pp. 1-4, doi: 10.1109/IMBIOC.2019.8777884.

Jiang et al., "Emotion Recognition Using Electroencephalography Signals of Older People for Reminiscence Therapy", Frontiers in Physiology, published: Jan. 7, 2022, 13 pages, doi: 10.3389/fphys.2021.823013.

Khalil et al., "Implementation of Machine Learning in BCI Based Lie Detection", 2022 IEEE World AI IoT Congress (AIIoT), pp. 213-217, doi:10.1109/AIIoT54504.2022.9817162.

Kimmatkar et al., "Novel Approach for Emotion Detection and Stabilizing Mental State by Using Machine Learning Techniques", Computers 2021, 10, 37, 20 pages, https://doi.org/10.3390/computers10030037.

Kimmatkar et al., "The Study of Emotional Brain to Detect Emotions Using Brain EEG Signals and Improving Accuracy of Emotion Detection System Using Feature Selection Techniques", Abstract only, ICMVA '22: Proceedings of the 2022 5th International Conference on Machine Vision and Applications, Feb. 2022, pp. 22-33, https://doi.org/10.1145/3523111.3523115.

Maithri et al., "Automated emotion recognition: Current trends and future perspectives", Computer Methods and Programs in Biomedicine, vol. 215, Mar. 2022, 106646, 30 pages, <https://doi.org/10.1016/j.cmpb.2022.106646>.

Mandal et al., "SoK: Your Mind Tells a Lot About You: On the Privacy Leakage via Brainwave Devices", WiSec '22, May 16-19, 2022, Session 5: Wearable and Cellular Security, San Antonio, TX, USA, pp. 175-187, https://doi.org/10.1145/3507657.3528541.

Martinescu et al., "Self-Evaluative and Other-Directed Emotional and Behavioral Responses to Gossip About the Self", Frontiers in Psychology, Jan. 4, 2019, Sec. Organizational Psychology, vol. 9, Article 2603, 16 pages, https://doi.org/10.3389/fpsyg.2018.02603.

Miller et al., "Cortical activity during motor execution, motor imagery, and imagery-based online feedback", PNAS, Mar. 2, 2010, vol. 107, No. 9, 6 pages, www.pnas.org/cgi/doi/10.1073/pnas.0913697107.

Napolitano, Anna, "Study casts new light on mirror neurons", Nature, Aug. 24, 2021, 3 pages, <https://www.nature.com/articles/d43978-021-00101-x>.

Pandarinath et al., "High performance communication by people with paralysis using an intracortical brain-computer interface", eLIFE Sciences, Feb. 21, 2017, 27 pages, <https://doi.org/10.7554/eLife.18554>.

Pandarinath et al., "The Science and Engineering Behind Sensitized Brain-Controlled Bionic Hands", Physiological Reviews, vol. 102, Issue 2, Published Sep. 20, 2021, pp. 511-1158, doi/10.1152/physrev.00034.2020.

Pfurtscheller et al., "Rehabilitation with Brain-Computer Interface Systems", Published by the IEEE Computer Society, Oct. 2008, 8 pages.

Rahim et al., "Emotion Charting Using Real-time Monitoring of Physiological Signals", 2019 International Conference on Robotics and Automation in Industry (ICRAI), Rawalpindi, Pakistan, 2019, pp. 1-5, doi: 10.1109/ICRAI47710.2019.8967398.

Rahman et al., "Recognition of human emotions using EEG signals: A review", Computers in Biology and Medicine, vol. 136, Sep. 2021, 104696, 18 pages, <https://www.sciencedirect.com/science/article/abs/pii/S001048252100490X>.

Ramirez et al., "Detecting Emotion from EEG Signals Using the Emotive Epoc Device", Abstract only, International Conference on Brain Informatics, BI 2012: Brain Informatics, pp. 175-184, Part of the Lecture Notes in Computer Science (LNAI, vol. 7670), Springer, Berlin, Heidelberg. https://doi.org/10.1007/978-3-642-35139-6_17.

Robbins et al., "Who Gossips and How in Everyday Life?", Abstract only, Social Psychological and Personality Science, First published online May 2, 2019, 13 pages, https://doi.org/10.1177/1948550619837000.

Ryding et al., "Silent Speech Activates Prefrontal Cortical Regions Asymmetrically, as Well as Speech-Related Areas in the Dominant Hemisphere", Brain and Language, vol. 52, Issue 3, Mar. 1996, pp. 435-451, <https://www.sciencedirect.com/science/article/abs/pii/S0093934X96900231>.

Shu et al., "A Review of Emotion Recognition Using Physiological Signals", Sensors, Published: Jun. 28, 2018, 41 pages, http://dx.doi.org/10.3390/s18072074.

Stachowski et al., "Spinal Inhibitory Interneurons: Gatekeepers of Sensorimotor Pathways", International Journal of Molecular Sciences, 2021, 22, 2667, Published: Mar. 6, 2021, 17 pages, https://doi.org/10.3390/ijms22052667.

Szameitat et al., "Motor imagery of complex everyday movements. An fMRI study", NeuroImage, vol. 34, Issue 2, Jan. 15, 2007, pp. 702-713, https://doi.org/10.1016/j.neuroimage.2006.09.033.

Tam et al., "Human motor decoding from neural signals: a review", BMC Biomedical Engineering, Published: Sep. 3, 2019, 22 pages, https://doi.org/10.1186/s42490-019-0022-z.

Tivatansakul et al., "Emotion Recognition using ECG Signals with Local Pattern Description Methods", International Journal of Affective Engineering, Dec. 2015, 12 pages, DOI: 10.5057/ijae.IJAE-D-15-00036.

Trafton, Anne, "How we tune out distractions", MIT News, Jun. 12, 2019, 6 pages, <https://news.mit.edu/2019/how-brain-ignores-distractions-0612>.

Vazquez et al., "Neural signals implicated in the processing of appetitive and aversive events in social and non-social contexts", Frontiers in Systems Neuroscience, Aug. 3, 2022, vol. 16—2022, 18 pages, https://doi.org/10.3389/fnsys.2022.926388.

Wahab et al., "EEG signals for emotion recognition", Abstract only, Special Supplement Issue in Section A and B: Selected Papers from the ISCA International Conference on Software Engineering and Data Engineering, 2009, 2 pages, <https://content.iospress.com/articles/journal-of-computational-methods-in-sciences-and-engineering/jcm00263>.

Wang et al., "Multi-modal emotion recognition using EEG and speech signals", Computers in Biology and Medicine, vol. 149, Oct. 2022, 105907, 13 pages, <https://doi.org/10.1016/j.compbiomed.2022.105907>.

Willett et al., "High-performance brain-to-text communication via imagined handwriting", bioRxiv preprint, this version posted Jul. 2, 2020, 21 pages, https://doi.org/10.1101/2020.07.01.183384.

Wilson et al., "Listening to speech activates motor areas involved in speech production", Abstract only, Nature Neuroscience vol. 7, pp. 701-702 (2004), <https://www.nature.com/articles/nn1263>.

Xue et al., "Common Neural Substrates for Inhibition of Spoken and Manual Responses", Cerebral Cortex, Aug. 2008;18:1923—1932, doi: 10.1093/cercor/bhm220, Advance Access publication Jan. 31, 2008.

Yuen et al., International Journal of Integrated Engineering (Issue on Electrical and Electronic Engineering), 2009, 10 pages.

(56) References Cited

OTHER PUBLICATIONS

Chikara et al. "Neural Activities Classification of Human Inhibitory Control Using Hierarchical Model", Sensors (Basel), Sep. 1, 2019, p. 3791 (18 pages), vol. 19, No. 17.

International Searching Authority, "Notification of Transmittal of the International Search Report and the Written Opinion of the International Searching Authority, or Declaration," Patent Cooperation Treaty, Nov. 25, 2024, 12 pages, International Application No. PCT/IB2024/057912.

Neupane et al. "Brain Hemorrhage: When Brainwaves Leak Sensitive Medical Conditions and Personal Information", 2019 17th International Conference on Privacy, Security And Trust (PST), IEEE, Aug. 26, 2019, pp. 1-10.

Hammond, D., "What is Neurofeedback: An Update," Journal of Neurotherapy: Investigations in Neuromodulation, Neurofeedback and Applied Neuroscience, Nov. 30, 2011, vol. 15 No. 4 , pp. 305-336.

* cited by examiner

PROTECTING CONFIDENTIAL INFORMATION IN A NEURAL-COMPUTER INTERFACE SYSTEM

BACKGROUND

The present disclosure relates to neural-computer interfaces and, more specifically, to user interaction and protection of confidential information based on neural signal classification.

Neural-computer interfaces (NCIs) detect conscious and intended neural signals and associate these signals with corresponding directed behaviors, movements, language, etc. For example, NCIs can be used to translate neural signals into actions for controlling robotic limbs, moving a cursor on a computer screen, generating text (e.g., "thought-to-type"), etc. It is also possible to detect neural signals, as well as other signals (e.g., galvanic skin response or heart rate variability), associated with emotions. Neural and other signals can be detected non-invasively via wearable technology (e.g., headbands, wrist-worn devices, etc.).

SUMMARY

Various embodiments are directed to a method carried out by a processor communicatively coupled to a memory. The method includes monitoring, by a processor communicatively coupled to a memory, neural signals collected from a user by a neural-computer interface (NCI) device. In some embodiments, the NCI device is a wearable device. The monitoring may include monitoring a type of signal selected from brainwaves, hemodynamic response, event-related potential (ERP), skin conductance response (SRP), and cortical activity. The method further includes detecting, by the processor and based on the monitoring, an inhibitory signal in the neural signals and determining, by the processor and in response to the detecting, that the inhibitory signal is aligned with an emotionally salient signal. Additionally, the method includes generating, by the processor and in response to the determining, a notification. The notification is displayed at an output device. In some embodiments, the method includes receiving a response to the notification input by the user. The response may include instructions to delete a portion of the neural signals. In some embodiments, the method includes deleting a portion of the neural signals in response to determining that the inhibitory signal is aligned with the emotionally salient signal. For example, the deleting may be carried out automatically based on stored user preferences.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
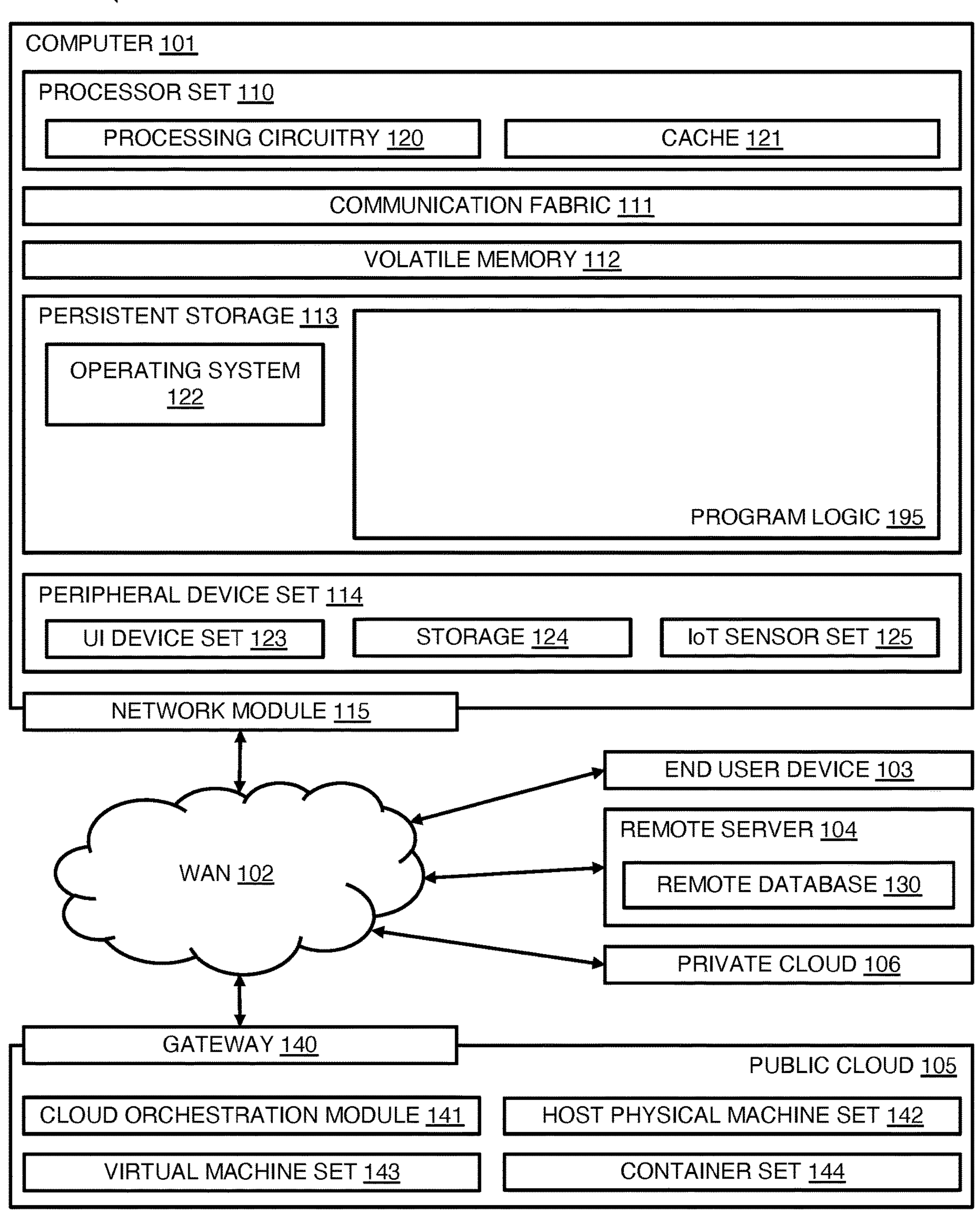
FIG. 1 is a block diagram illustrating a computing environment, according to some embodiments.

Aspects of the present disclosure relate generally to neural-computer interfaces (NCIs) and, more specifically, to user interaction and protection of confidential information based on neural signal classification. While the present disclosure is not necessarily limited to such applications, various aspects of the disclosure may be appreciated through a discussion of various examples using this context.

Neural signals can be detected via non-invasive wearable NCI (also known as brain-computer interface (BCI)) devices such as headbands, helmets, glasses, neck or jaw sensors, ear-worn devices, and wrist-worn devices configured to receive and interpret signals from the brain, spinal cord, and/or downstream peripheral nervous system. Similarly, wearable devices can be used to detect other physiological signals such as skin galvanic response, heartrate, etc. NCIs are able to detect conscious and intended neural signals and associate these signals with corresponding directed behaviors, movements, language, etc. For example, NCIs can be used to translate neural signals into actions for controlling robotic limbs, moving a cursor on a computer screen, generating text, etc. NCIs are currently used in a variety of applications, such as wellness, gaming, augmented and/or virtual reality (AR/VR), social media, and workplace accessibility.

NCI technology is rapidly developing, and it will likely be possible to translate neural signals into specific information in the near future. This will enable numerous beneficial applications, but there are also potential drawbacks that must be considered. For example, when a user is wearing a device that can translate signals into information, it may be possible for the device to collect personal and/or confidential information with or without the user's knowledge. Technology for preventing the collection and disclosure of this information is therefore needed in order to use NCIs safely and responsibly.

Embodiments of the present disclosure may overcome these and other challenges by detecting the potential disclosure of private (e.g., personal and/or confidential) information without requiring that the associated neural signal be translated. The potential disclosure may be detected by identifying, in monitored neural data, inhibitory signals associated with speech- and/or motor-function and emotionally salient neural signals co-occurring with the inhibitory signals. Upon detecting the potential disclosure of information, various actions may be taken, such as preventing the signal from being recorded or stored, alerting the device user, etc. In some embodiments, real-time feedback can be generated in order to notify a user of the potential disclosure, thereby allowing the user to take mitigating actions.

The aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 is a block diagram illustrating a computing environment 100, according to some embodiments. Computing environment 100 contains an example of a program logic 195 for the execution of at least some of the computer code involved in performing the inventive methods, such as detecting neural signals associated with potential disclosure of confidential information, alerting a user, and responding to user feedback. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
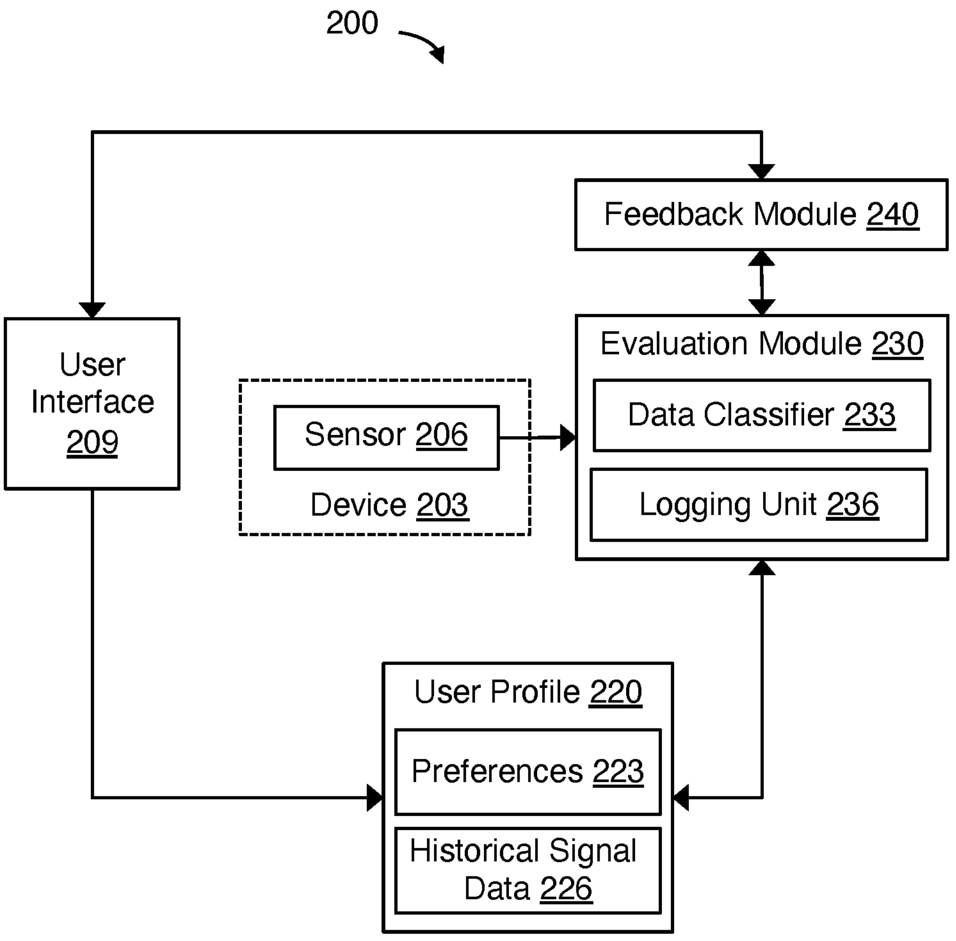
FIG. 2 is a block diagram illustrating a computing environment for evaluating and reacting to feature removal, according to some embodiments.

FIG. 2 is a block diagram illustrating a computing environment 200 for neural signal detection, interpretation, and user interaction, according to some embodiments. Computing environment 200 may implement program logic 195 (FIG. 1). Environment 200 may include an NCI device 203 with a sensor 206, a user interface 209, user profile 220 that includes a set of preferences 223 and historical signal data 226, an evaluation module 230 that includes a data classifier 233 and logging unit 236, and a feedback module 240.

The NCI device 203 can be any appropriate wearable NCI device (e.g., headband, helmet, glasses, neck or jaw sensor, ear-worn device, wrist-worn device, etc.). The sensor 206 can be in contact with a user such that the sensor 206 is able to detect neural signals. Examples of these neural signals may include mu waves (e.g., 8-13 Hz), beta waves (e.g., 12.5-30 Hz), hemodynamic response, event-related potential (ERP), skin conductance response (SRP), cortical activity, heartrate, etc. In some embodiments, all of these signals may be monitored. In other embodiments, one or more of the signals is selected for monitoring. These can be determined through a variety of technologies, such as functional magnetoresistance imaging (fMRI), electroencephalography (EEG), and detectors for peripheral/sympathetic nervous system activity like heartrate variability and/or galvanic skin response.

The user profile 220 can store a set of preferences 223 entered by the user (via the user interface 209) and a set of historical signal data 226. As discussed in greater detail below, the user profile 220 can also include a mapping of historical data classification, neural signal data, and user decision data. The user preferences 223 may indicate what type of notifications the user wants to receive, as well as the frequency and method of notification (see below). The user preferences 223 may also indicate the type of NCI device(s) 203, identify an optional additional device (output device) to be used for receiving notifications and/or providing the user interface 209, indicate a sensitivity threshold for sending notifications, etc. In some embodiments, the additional device may be a smartphone or other computing device. In further embodiments, the user interface 209 may be provided on the NCI device 203 itself.

The user preferences 223 may also store instructions for neural data logging and storing, data reporting preferences, and/or data sharing preferences. The neural data logging and storing instructions can indicate whether to store neural signal data in the historical signal data 226 automatically or to store the signal data in a temporary collection cache. These instructions may be provided to the logging unit 236. The neural data logging and storing instructions can also indicate whether to store the historical signal data 226 on the NCI device 203, system, cloud platform, or other location. The data reporting preferences can indicate whether to generate data reports periodically, in response to a user request, in response to detecting a potential disclosure, etc. The data reporting preferences may also indicate what/how to report. For example, a data report may provide, via the user interface 209 and for each detection of a potential disclosure, a corresponding timestamp, location, type of neural signals detected, duration of signals/disclosure, etc. The data sharing preferences may indicate whether to share neural data collected by the device with other users, creators, or third parties (e.g., when no potential disclosure has been detected) as well as options for how the NCI device 203 may re-use and learn from the collected data (e.g., to maintain a personalized corpus of the historical signal data 226 used to optimize future detection of potential disclosures/inhibitory signals).

An initial set of historical signal data 226 may be collected during a training phase in which signals are collected by the sensor 206 and processed by the evaluation module 230. In the training phase, the user, while being monitored by the sensor 206, may be presented with stimuli for calibrating the evaluation module 230 and NCI device 203 to the user's unique neural signals associated with action, speech, and emotion. Future neural signal data may also be added to the historical signal data 226 when available (e.g., after being collected by the sensor 206, evaluated by the evaluation module 230, and approved for storage by the user).

The neural signal data collected by the sensor can include inhibitory signals that indicate a potential disclosure. The types of inhibitory signals detected by the sensor 206 can vary based on the type of NCI device 203/sensor 206 used to collect neural signals. Examples of inhibitory signals that may be used can include brainwave-based inhibitory signals, such as ongoing mu rhythm suppression and/or contralateral event-related desynchronization (ERD) of beta rhythms in the sensorimotor cortex prior to speech or action. Examples can also include inhibitory signals detected based on hemodynamic response, such as decreased blood flow to Broca's area with concurrent increased blood flow in the dorsal motor and sensorimotor cortex.

Further examples of inhibitory signals can include ERP-based signals. ERP-based inhibitory signals may include a significant N200 response or multiple consecutive N200 responses. Other ERP-based inhibitory signals may include mediofrontal negativity signals such as error-related negativity (ERN) or feedback error-related negativity (fERN), which can require user and/or device learning from prior interactions as it occurs after instead of prior to action. ERP-based inhibitory signals may also include frontal "negativity preceding movement" signals occurring, e.g., about 500 ms prior to speech/movement and/or an accumulation of ERN in anterior cingulate cortex over the course of an interaction/event. Cortical activity-based inhibitory signals may be also be used, such as signals based on ongoing changes between left and right inferior frontal cortical activity.

Neural signals collected by the NCI device 203/sensor 206 can also include signals related to emotional identification, valence, and/or intensity. Emotion-related neural signals may be given salience scores, which can include a measure of intensity. Emotion-related neural signals with salience scores above a threshold are referred to herein as "emotionally salient signals". The inhibitory and/or emotionally salient signals may be detected in the collected neural signals by the evaluation module 230.

The evaluation module 230 can include a data classifier 233 and a logging unit 236. The evaluation module 230 can receive the signal data from the sensor module 206. The evaluation module 230 may include algorithms for automatically preprocessing the neural signal data for the data classifier 233 (e.g., electrode identification, epoch estimation, artifact and band-pass filtering, noise canceling/signal optimization, principal component analysis, etc.). The data classifier 233 may evaluate the neural signals collected by the sensor 206 and classify them as corresponding to speech-, motor-, or emotion-related signals. The data classifier 233 may identify the type/intensity of the signals, and determine an alignment of the signals. For example, the data classifier 233 can align the signals to determine whether speech/motor-related inhibitory signal(s) co-occur with an emotionally salient signal. The data classifier 233 may also determine whether the same type of inhibitory signal was previously reacted to by the user (e.g., via the user interface 209) in response to a notification, such as the notifications discussed below.

If the evaluation module 230 determines that an inhibitory signal and co-occurring emotionally salient signal have been received, the evaluation module 230 can direct the feedback module 240 to produce a notification indicating to the user that a potential disclosure has been detected. The notification may be conveyed by the NCI device 203 or another device connected to the NCI device 203 via, e.g., Bluetooth® or Wi-Fi®. For example, the notification may include a push notification, text message, alert noise, haptic feedback, and/or other method of notification. The notification method may vary based on the user preferences 223, type of NCI device 203, etc.

Upon receiving a response to the notification from the user via the user interface 209, the logging unit 236 may either delete the collected signal data or send the collected signal data to be stored in the historical signal data 226. For example, if the user receives a notification that a potential disclosure was detected, the user may respond by confirming that the signal data should be deleted. In some embodiments, the logging unit 236 then automatically deletes signal data from a predetermined time during, after, or surrounding the detected potential disclosure. In other embodiments, the user may instruct the logging unit 236 to delete signal data from a selected period of time, e.g., after reviewing a data report generated by the feedback module 240.

In another example, the user may respond to the feedback module 240 by confirming or denying the potential disclosure without instructions to delete the signal data or with instructions to store the signal data. In these instances, the logging unit 236 may add the signal data and user response to the historical signal data 226. Models used by the data classifier 233 may be retrained on the updated historical signal data 226. In some embodiments, if the user ignores the notification, the signal data associated with the potential disclosure may be either automatically deleted or automatically stored based on instructions in the user profile 220. If the signal data is stored in the historical signal data 226 or temporarily stored by the logging unit 236, the user may optionally input instructions for deleting the data after a later review of the notification and/or report.

In some embodiments, based on the user preferences 223, the evaluation module 230 may automatically stop recording data from the sensor 206 upon detection of a potential disclosure. In these instances, the feedback module 240 may send a notification to the user to indicate that recording has stopped and provide an option for resuming recording.

In further embodiments, the user may select an option for providing a confidentiality assistant via the feedback module 240. For example, if the user is concerned about potentially disclosing confidential information in conversation, in a social media post, etc., the user may opt in to allow "reminder" notifications in real time upon detecting an inhibitory signal aligned with emotional salience. This may provide the user a chance to reconsider whether the information should be disclosed.

Figure 3:
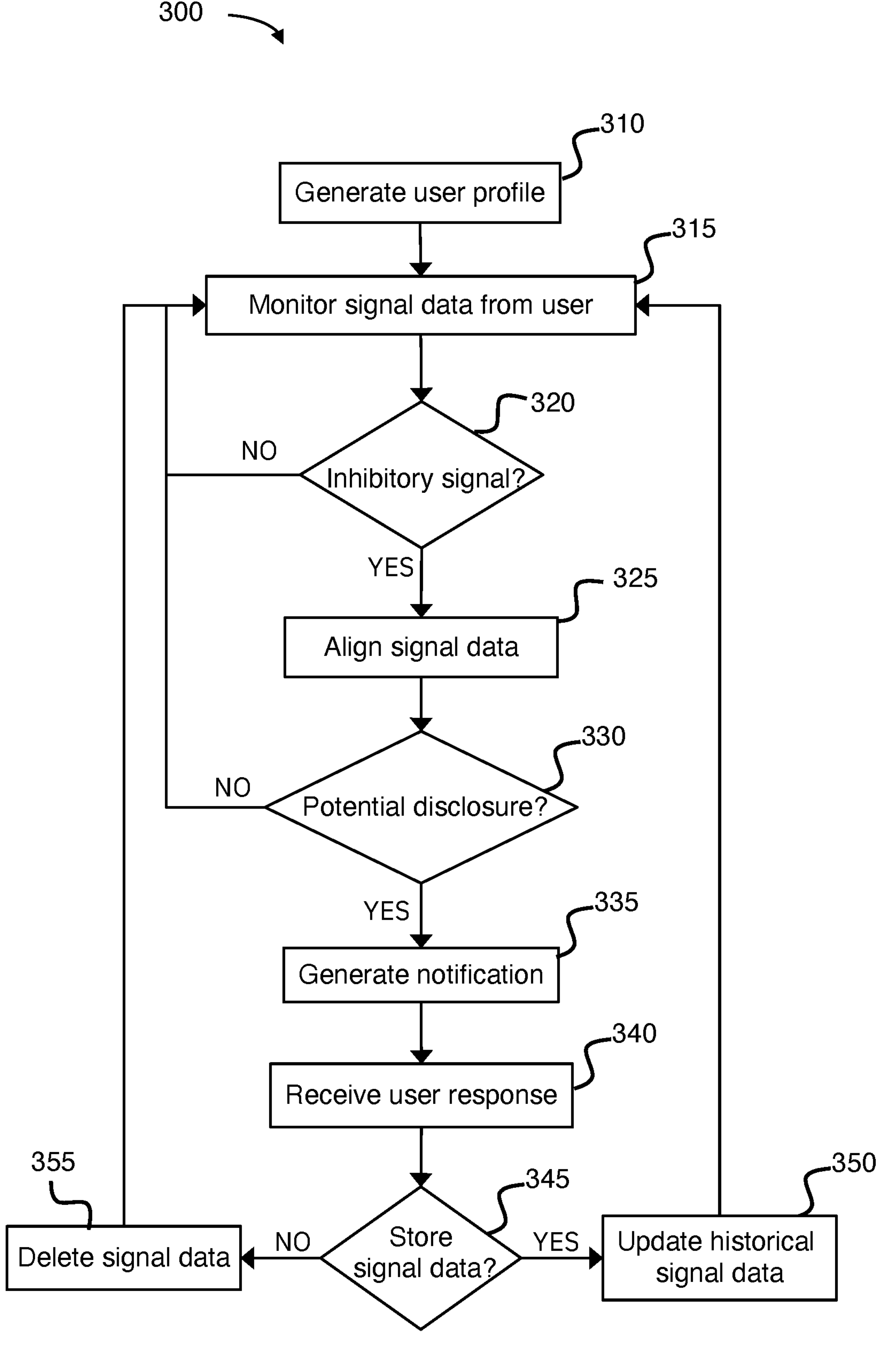
FIG. 3 is a flowchart illustrating a process of evaluating and reacting to the effects of feature deletion on policies, according to some embodiments.

FIG. 3 is a flowchart illustrating a process 300 of detecting and reacting to potential disclosures of confidential information, according to some embodiments. Process 300 may be performed by components of environment 200 and, for illustrative purposes, is discussed with reference to FIG. 2. At operation 310, a user profile 220 can be generated for a user interacting with an NCI device 203. The user profile 220 can include preferences 223 entered via a user interface 209. The user preferences 223 can be used to determine how to handle neural signal data and generate notifications. Generating the user profile 220 can also include identifying the NCI device 203 and calibrating an evaluation module 230 and the NCI device 203 to the user's neural signals associated with action, speech, and emotion.

Neural signals collected by the NCI device 203/sensor 206 can be received and monitored by the evaluation model 230. This is illustrated at operation 315. The neural signals can include at least one type of neural data and/or related physiological data, such as brainwaves (e.g., mu and/or beta waves), hemodynamic response, ERP, SRP, cortical activity, heartrate, etc. The data classifier 233 can determine whether the monitored neural signals include an inhibitory signal. Examples of inhibitory signals that may be detected are discussed in greater detail above. The data classifier 233 may use various techniques to identify inhibitory signals and emotionally salient signals. For example, neural signals may be evaluated using advanced statistical strategies with neural networks. In some embodiments, the data classifier uses machine learning techniques such as k-nearest neighbor, convolutional, recurrent, or deep neural networks, hidden Markov models, etc.

If no inhibitory signal is detected (NO at operation 320), operation 315 can continue. However, if an inhibitory signal is detected during the monitoring (YES at operation 320), the data classifier 233 can align the signal data. This is illustrated at operation 325. The inhibitory signal can be a signal related to inhibition of speech or an action (motor-related). Aligning the signal data can include determining whether an emotionally salient signal occurred at the same time (or co-occurred within a threshold range of time) as the inhibitory signal. The emotionally salient signal may be identified as neural/related physiological data characteristic of heightened emotional intensity (e.g., above a baseline intensity or higher threshold).

If the detected inhibitory signal is not aligned with an emotionally salient (NO at operation 330), process 300 can return to operation 315. However, if the data classifier 233 determines that the inhibitory signal is aligned with an emotionally salient signal, this can be identified as a potential disclosure (YES at operation 330). In response to detecting the potential disclosure, a notification can be generated by the feedback module 240. This is illustrated at operation 335. The notification can alert the user (e.g., via the user interface 209) to the potential disclosure. In some embodiments, the feedback module 240 also generates a data report at operation 335. Generating notifications and data reports is discussed in greater detail with respect to FIG. 2.

A response to the notification from the user may be received. This is illustrated at operation 340. In the response, the user may indicate that the signal data corresponding to the inhibitory signal should not be stored (NO at operation 345). In response, the logging unit may delete the signal data collected within a range of time before, during, and/or after the detection of the inhibitory signal. This is illustrated at operation 355. Process 300 can then return to monitoring the signal data at operation 315.

If the user's response indicates that the signal data can be stored (YES at operation 345), the logging unit 236 can add the signal data to the historical signal data 226. This is illustrated at operation 350. The historical signal data may optionally be used to optimize the data classification models used at operation 325 and/or shared in some embodiments. If the user ignores the notification, a "response" may be obtained from the preferences 323, which can include instructions for whether to store or delete signal data when a notification is ignored. Process 300 may then return to operation 315.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms “a,” “an,” and “the” are intended to include the plural forms as well, unless the context clearly indicates otherwise. It will be further understood that the terms “includes” and/or “including,” when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. However, the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

As used herein, “a number of” when used with reference to items, means one or more items. For example, “a number of different types of networks” is one or more different types of networks.

Further, the phrase “at least one of,” when used with a list of items, means different combinations of one or more of the listed items can be used, and only one of each item in the list may be needed. In other words, “at least one of” means any combination of items and number of items may be used from the list, but not all of the items in the list are required. The item can be a particular object, a thing, or a category.

For example, without limitation, “at least one of item A, item B, and item C” may include item A, item A and item B, or item B. This example also may include item A, item B, and item C or item B and item C. Of course, any combinations of these items can be present. In some illustrative examples, “at least one of” can be, for example, without limitation, two of item A; one of item B; ten of item C; four of item B and seven of item C; or other suitable combinations.

What is claimed is:

1. A method, comprising:

monitoring, by a processor communicatively coupled to a memory, neural signals collected from a user by a neural-computer interface (NCI) device, wherein the monitoring comprises classifying the neural signals as speech-, motor-, or emotion-related;

detecting, by the processor and based on the monitoring, a potential disclosure of confidential information, wherein the detecting comprises:

detecting an inhibitory signal in the neural signals classified as speech- or motor-related;

in response to the detecting the inhibitory signal, aligning the inhibitory signal with a co-occurring neural signal from the neural signals classified as emotion-related; and determining that the co-occurring neural signal is aligned with an emotionally salient signal;

generating, by the processor and in response to the detecting the potential disclosure of confidential information, a notification;

displaying, at an output device, the notification; and deleting, by the processor, a portion of the neural signals from a time range selected based on the potential disclosure of confidential information.

2. The method of claim 1, further comprising receiving a user-input response to the notification.

3. The method of claim 2, wherein the response comprises instructions to delete the portion of the neural signals.

4. The method of claim 1, wherein the NCI device is a wearable device.

5. The method of claim 1, wherein the monitoring comprises monitoring a type of signal selected from the group consisting of brainwaves, hemodynamic response, event-related potential (ERP), skin conductance response (SRP), and cortical activity.

6. The method of claim 1, wherein the deleting is carried out automatically based on stored user preferences.

7. The method of claim 1, further comprising detecting, by the processor and based on the monitoring, an additional potential disclosure of confidential information.

8. The method of claim 7, further comprising automatically storing a portion of the neural signals from a time range selected based on the additional potential disclosure of confidential information in a temporary collection cache.

9. The method of claim 1, further comprising automatically stopping the collection of the neural signals in response to the detecting the potential disclosure of confidential information.

10. A system, comprising:

a memory; and a processor communicatively coupled to the memory, wherein the processor is configured to perform a method comprising:

monitoring, by the processor, neural signals collected from a user by a neural-computer interface (NCI) device, wherein the monitoring comprises classifying the neural signals as speech-, motor-, or emotion-related;

detecting, by the processor and based on the monitoring, a potential disclosure of confidential information, wherein the detecting comprises:

detecting an inhibitory signal in the neural signals classified as speech- or motor-related;

in response to the detecting the inhibitory signal, aligning the inhibitory signal with a co-occurring neural signal from the neural signals classified as emotion-related; and determining that the co-occurring neural signal is aligned with an emotionally salient signal;

generating, by the processor and in response to the detecting the potential disclosure of confidential information, a notification;

displaying, at an output device, the notification; and deleting, by the processor, a portion of the neural signals from a time range selected based on the potential disclosure of confidential information.

11. The system of claim 10, further comprising receiving a user-input response to the notification.

12. The system of claim 11, wherein the response comprises instructions to delete the portion of the neural signals.

13. The system of claim 10, wherein the NCI device is a wearable device.

14. The system of claim 10, wherein the monitoring comprises monitoring a type of signal selected from the group consisting of brainwaves, hemodynamic response, event-related potential (ERP), skin conductance response (SRP), and cortical activity.

15. The system of claim 10, wherein the deleting is carried out automatically based on stored user preferences.

16. A computer program product, the computer program product comprising a computer readable storage medium having program instructions embodied therewith, the program instructions executable by a processor to cause a device to perform a method, the method comprising:

monitoring, by the processor, neural signals collected from a user by a neural-computer interface (NCI) device, wherein the monitoring comprises classifying the neural signals as speech-, motor-, or emotion-related;

detecting, by the processor and based on the monitoring, a potential disclosure of confidential information, wherein the detecting comprises:

detecting an inhibitory signal in the neural signals classified as speech- or motor-related;

in response to the detecting the inhibitory signal, aligning the inhibitory signal with a co-occurring neural signal from the neural signals classified as emotion-related; and determining that the co-occurring neural signal is aligned with an emotionally salient signal;

generating, by the processor and in response to the detecting the potential disclosure of confidential information, a notification;

displaying, at an output device, the notification; and deleting, by the processor, a portion of the neural signals from a time range selected based on the potential disclosure of confidential information.

17. The computer program product of claim 16, further comprising receiving a user-input response to the notification, wherein the response comprises instructions to delete a portion of the neural signals.

18. The computer program product of claim 16, wherein the NCI device is a wearable device.

19. The computer program product of claim 16, wherein the monitoring comprises monitoring a type of signal selected from the group consisting of brainwaves, hemodynamic response, event-related potential (ERP), skin conductance response (SRP), and cortical activity.

20. The computer program product of claim 16, wherein the deleting is carried out automatically based on stored user preferences.

* * * * *